Jan. 30, 1968  E. A. ZADIG  3,365,906
AUTOMOBILE AIR CONDITIONING SYSTEM
Filed Feb. 1, 1966
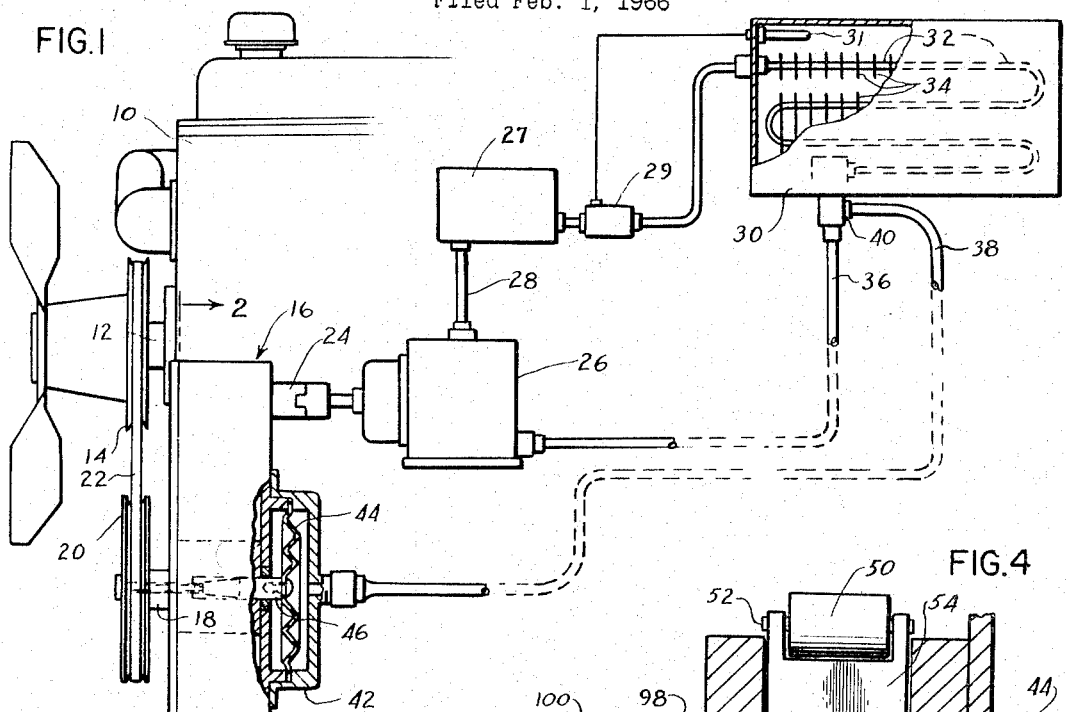
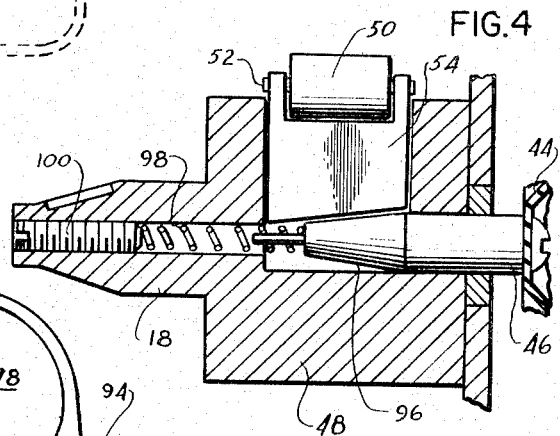
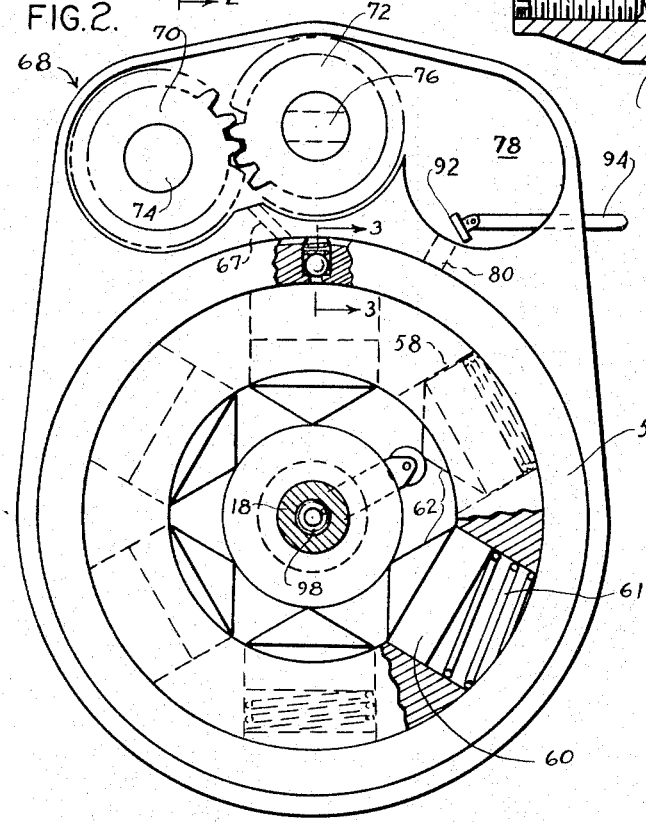
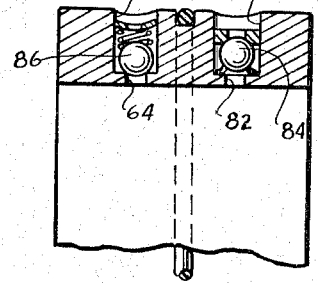
INVENTOR.
ERNEST A. ZADIG
BY *Sandoe Hill Schottky & Wheeler*
ATTORNEYS United States Patent Office 3,365,906
Patented Jan. 30, 1968

3,365,906
AUTOMOBILE AIR CONDITIONING
SYSTEM
Ernest A. Zadig, 1 Bouton St., South Norwalk,
Conn. 06854
Filed Feb. 1, 1966, Ser. No. 524,119
4 Claims. (Cl. 62—226)

ABSTRACT OF THE DISCLOSURE

An improved drive arrangement between the engine of an automobile and the compressor of an air conditioner in the automobile is provided. The drive comprises a fluid driven motor coupled to the compressor. A variable volume fluid pump is coupled to the car engine. The pump volume delivered is responsive to evaporator pressure so that when the pressure rises in the evaporator the fluid volume is increased and the compressor speed increases and when evaporator pressure falls, the fluid volume and compressor speed is decreased. Thus, compressor speed is regulated by demand, not engine speed improving efficiency.

---

This invention relates to air conditioning and, more particularly, relates to an air conditioner for an automobile in which the compressor drive is derived from the internal combustion engine of the automobile.

In recent years, the installation of air conditioning systems in automobiles has increased. The air conditioner itself is conventional, including a refrigerant compressor condenser, expansion valve and an evaporator unit into which the compressed refrigerant is introduced and allowed to expand. During the expansion, the evaporator unit is cooled. A fan may be used to draw air through the cool evaporator unit and to distribute the cool air through the automobile interior.

The use of the internal combustion engine as the driving source for the air conditioning system does, however, introduce several problems. The speed of the internal combustion engine is regulated in accordance with the commands of the driver to provide the desired car speed. Since the car's speed is completely unrelated to the air conditioning needs, several operating problems arise. For example, under conditions of heavy air conditioning demands and low speed driving conditions, as in city traffic, it has been found difficult to drive the air conditioner compressor at the speeds necessary to supply adequate cooling. In many installations, the size of the air conditioning system is selected so as to provide the desired cooling at low engine speeds. Thus, however, at high engine speeds, the air conditioning system would be overdriven and the art has provided relatively complex regulatory systems such as bypass valves to avoid overdriving the compressor with resultant frost blockage of the evaporator unit.

It is, therefore, an object of the present invention to provide an improved variable speed drive between the internal combustion engine of an automobile and a refrigerant compressor of the air conditioning system installed in the automobile.

In accordance with this object, there is provided, in a preferred embodiment of this invention, an improved variable speed drive installed in an automobile air conditioning system having an internal combustion engine which operates at varying speeds and an air conditioner in the vehicle having a refrigerant compressor condenser, expansion valve, and evaporator. The variable speed drive consists of a fluid driven motor coupled to the refrigerant compressor of the air conditioning unit in driving relationship thereto and a variable volume fluid pump coupled to the car engine in driven relationship to provide a variable volume of fluid which is fed to the fluid drive motor. Means are provided in the variable volume fluid pump to control the fluid volume delivered thereby in response to the pressure in the evaporator unit.

In this manner, the evaporator pressure is utilized to regulate the fluid volume delivered by the pump. Thus, for example, when the car is extremely warm and the internal combustion engine operated at a very low speed such as at idle, the pressure in the evaporator will rise, increasing the fluid volume delivered by said pump and increasing the speed of refrigerant compression. Thus, the air conditioning unit operates at a much higher speed than it would if governed by the speed of the internal combustion engine and is capable of carrying a high air conditioning load. When the air conditioning load decreases or the speed of the internal combustion engine increases as, for example, on highway travel, the pressure in the evaporator will decrease. The pressure responsive means will decrease the fluid supplied by the pump so that the pressure in the evaporator never falls below the pressure which would cause frosting of the evaporator coil and fins, resulting in an inoperative unit.

The variable volume can go to zero so that even though the internal combustion engine is turning over at a very high r.p.m., the refrigerant compressor speed can be reduced to zero if conditions so demand. On the other hand, when the speed of the internal combustion engine is very low, the volume of fluid delivered by the pump can be increased so as to provide the necessary transmission ratio to drive the refrigerant compressor at an effective speed.

With this arrangement, the size of the refrigerant compressor is determined by the air conditioning load since it can be driven at its predesigned operating speed even though the engine is operating at a very low speed. Thus, the compressor is far smaller than the normal compressor installed in such systems. In addition, since the speed control provides compensation for overspeeding of the compressor with increased engine speed, it is unnecessary to provide the relatively complex refrigerant bypass systems found necessary by the art to artificially disable the compressor during conditions of high engine r.p.m. and/or low air conditioning demands.

Having briefly described this invention, it will be described in greater detail along with other objects and advantages in the following portions of the specification, which may best be understood by reference to the accompanying drawings, of which:

FIG. 1 is a partially sectioned view in schematic form of an air conditioning system in accordance with the present invention;

FIG. 2 is a cross section view taken along lines 2—2 of FIG. 1;

FIG. 3 is a cross section view taken along lines 3—3 of FIG. 2; and

FIG. 4 is a sectioned view of a portion of the apparatus shown in FIG. 1 to enlarged scale.

In the figures, there is shown a typical automobile air conditioning system using the internal combustion engine 10 of the vehicle as the primary drive for the air conditioning system. The drive shaft 12 of the internal combustion engine 10 extends outwardly and a sheave 14 is mounted thereon. A variable speed drive 16 is provided having a driven shaft 18 on which sheave 20 is mounted. Sheave 20 is coupled to sheave 14 by a belt 22 to drive the driven shaft 18 as the internal combustion engine 10 is operated. The output shaft 24 of the drive 16 is coupled to the refrigerant compressor 26 which delivers compressed refrigerant to condenser 27 via the pipe 28, expansion valve 29, and to evaporator unit 30. The expansion valve 29 is controlled by thermal bulb 31 in contact with evaporator 30, where the refrigerant is allowed to expand, cooling the coils 32 and fins 34 thereof. The heated and expanded refrigerant is returned to the compressor via pipe 36. The variable speed drive 16 consists of a variable volume fluid pump and a fluid driven motor as will be described in greater detail subsequently. The purpose of the drive 16 is to drive the refrigerant compressor 26 at a speed determined by the air conditioning load despite variations in the speed of the internal combustion engine 10. In order so to do, a duct 38 is coupled via coupling 40 to the evaporator unit to transmit the evaporator pressure to the pressure responsive chamber 42 within which is mounted a diaphragm 44. The diaphragm is energized by the pressure variations and moves shaft 46 in response to the pressure variations in order to regulate the volume of fluid transmitted by the pump. The purpose of the regulation in accordance with evaporator pressure is to maintain the refrigerant compressor speed at as high an r.p.m. as is necessary to satisfy the most stringent conditions of operation, namely, high air conditioning load and low speed of the car engine 10. When these conditions change as, for example, during a trip on a highway, the evaporator pressure will decrease. If the refrigerant compressor speed were maintained, the evaporator temperature would drop below the frosting temperature and frost would block the evaporator cooling coils and fins 32 and 34 respectively, resulting in inoperability of the system. However, in the instant system, as the pressure drops in the evaporator unit, the speed of the refrigerant compressor 26 is reduced, if necessary, to zero r.p.m.

The variable speed drive 16 consists of a driven shaft 18 to which is coupled a driving cam roller assembly consisting of a housing 48, a cam roller 50 journalled on shaft 52 which is carried in the driving cam follower 54. The cam assembly is rotatably driven within the housing 56 which includes a plurality of radially extending cylinders 58. Pistons 60 are reciprocably mounted within each cylinder and are provided with a cone-shaped surface 62 sequentially engaged by the cam roller 50. A return spring 61 is provided to maintain the pistons in the bottom of the cylinders. The pistons may be provided with the usual sealing rings to provide a fluid-tight engagement with the cylinder walls. As the piston is driven upwardly by engagement with cam roller 50, it will pump fluid through the output port 64 into a delivery manifold 66 and passage 67 to deliver the fluid to a fluid gear motor, indicated generally as 68 and consisting of rotatably mounted gears 70 and 72. As the fluid is urged against the engaging teeth of the gears, it will drive both gears 70 and 72 on their respective axes 74 and 76. The output shaft 24 is coupled to the gear 72. The fluid is then returned to a sump 78 and from the sump returned via the passage 80 and a low pressure manifold 81 to the cylinder intake port 82.

To ensure unidirectional flow, check valves 84 and 86 are respectively provided in the intake and outtake ports of each cylinder. The high pressure output manifold and the input pressure manifold 66 and 81 respectively are preferably provided by circumferential passages linking the radial cylinders at the periphery of the housing. If desired, a manually operable valve 92 may be energized by a push rod 94 to close the exit from the sump thereby mechanically shutting off the system when operation thereof is not desired, and thereby eliminating the need for electric clutches presently used on automobile air conditioning systems.

In order to provide variable volume of fluid delivery in response to evaporator pressure, there is provided a pressure responsive chamber 42 within which is mounted a diaphragm 44. The center of the diaphragm is coupled to a cam actuator 46 which is provided with a conical surface 96 to engage the cam follower 54. The diaphragm pressure moves shaft 46 inwardly and outwardly against the bias of spring 98, the initial tension setting of which may be regulated by the position of the regulator screw 100. Thus, as the pressure in the evaporator unit is high, indicating a high cooling load, shaft 46 will be urged inwardly against the bias of spring 98. The conical surface 96 on shaft 46 will raise the cam follower 54 and the cam roller 50 to provide the greatest displacement of each piston within its respective cylinder as shaft 18 is rotated. The greater fluid delivery by the pump will cause the shaft 24 to rotate at a high r.p.m., driving the refrigerant compressor 26 at a correspondingly high r.p.m. and delivering a higher volume of compressed refrigerant to the evaporator unit 30. Should the compressor reduce the evaporator pressure below that required for frost free cooling, the reduced pressure on the diaphragm 44 will cause spring 98 to urge shaft 46 outwardly to reduce the piston displacement and thus the volume of fluid delivered. This will reduce the speed of the drive motor and the speed of the refrigerant compressor 26. The bias spring 98 is set so that when the evaporator reaches the frosting point, the pump will deliver no fluid and the refrigerant compressor will be stopped despite the speed of the internal combustion engine 10. For example, when using conventional Freon refrigerants, a pressure of 30 p.s.i. in the evaporator unit can be selected for zero fluid delivery.

In this manner, the speed of the drive of the refrigerant compressor 26 is controlled by the air conditioning demands, not by the variation in engine r.p.m. Thus, a smaller compressor can be used. In addition, since the drive of the refrigerant compressor can decrease to zero, it is unnecessary to supply the wasteful refrigerant bypass system or electric clutches to vary the coupling force and/or decouple the air conditioning system from the engine.

This invention may be variously modified and embodied within the scope of the subjoined claims.

What is claimed is:

1. In an automobile air conditioning system having an internal combustion engine operating at varying speeds dependent upon driver command and an air conditioner having an evaporator and a refrigerant compressor driven to compress a refrigerant which is fed into said evaporator to expand therein, an improved drive comprising a fluid driven motor, said fluid driven motor being coupled to said refrigerant compressor in driving relationship, a variable volume fluid pump, said pump being coupled to said internal combustion engine in driven relationship, pressure responsive means associated with said pump to control the fluid volume delivered thereby, and means coupling said pressure responsive means in said pump to said evaporator so that, when the pressure in said evaporator rises, the speed of the compressor is increased and, when the pressure decreases, the speed of the compressor is decreased.

2. An improved drive in accordance with claim 1 in which said variable volume fluid pump comprises at least one cylinder and a piston reciprocably driven within said cylinder, and in which said pressure responsive means control the piston displacement in response to variation of pressure in said evaporator.

3. An improved drive in accordance with claim 1 in which said variable volume fluid pump comprises a housing, a plurality of cylinders radially spaced within said housing, a like plurality of pistons, each of said pistons being reciprocably mounted within a respective cylinder, a driven shaft extending outwardly from said housing, a cam assembly carried on said driven shaft within said housing, said cam assembly including a cam follower and a cam roller, said cam roller being positioned to engage said pistons in displacing relationship within said cylinder as said driven shaft is rotated by said internal combustion engine, and an output port and an input port provided in each of said cylinders to permit fluid to pass through said output port as said cylinder is displaced by said cam and to permit fluid to flow therein as said piston is returned after displacement by said cam, a fluid driven gear motor, means coupling each of said output ports to said fluid driven gear motor in driving relationship, said fluid driven gear motor having an output shaft coupled to said refrigerant compressor.

4. An improved drive in accordance with claim 3 in which said pressure responsive means includes a pressure responsive chamber coupled to said evaporator unit, a diaphragm mounted therein, a shaft coupled to said diaphragm, said shaft having a cam surface to move said cam follower and said cam roller as said diaphragm is deflected by variations in pressure in said evaporator unit.

References Cited
UNITED STATES PATENTS

| | | | |
|---|---|---|---|
| 2,340,292 | 2/1944 | Aspelin | 62—226 |
| 2,467,398 | 4/1949 | Miller | 62—243 X |
| 2,899,941 | 7/1959 | Adams | 62—243 X |
| 3,062,020 | 11/1962 | Heidorn | 62—226 X |

MEYER PERLIN, *Primary Examiner.*